United States Patent
Bassi et al.

(10) Patent No.: US 7,384,617 B2
(45) Date of Patent: Jun. 10, 2008

(54) PROCESS AND EQUIPMENT FOR TREATING REFINARY GASES CONTAINING HYDROGEN SULPHIDE

(75) Inventors: Paolo Bassi, Vimercate (IT); Emanuele Cagnoli, S. Donato Milanese (IT)

(73) Assignee: Garo Dott.Ing. Roberto Gabbioneta S.p.A., Monza (IT)

( * ) Notice: Subject to any disclaimer, the term of this patent is extended or adjusted under 35 U.S.C. 154(b) by 340 days.

(21) Appl. No.: 10/546,564

(22) PCT Filed: Feb. 11, 2004

(86) PCT No.: PCT/EP2004/001242

§ 371 (c)(1),
(2), (4) Date: Aug. 19, 2005

(87) PCT Pub. No.: WO2004/073839

PCT Pub. Date: Sep. 2, 2004

(65) Prior Publication Data

US 2006/0165575 A1 Jul. 27, 2006

(30) Foreign Application Priority Data

Feb. 19, 2003 (IT) .......................... BG2003A0014

(51) Int. Cl.
*B01D 53/52* (2006.01)
*B01J 10/00* (2006.01)
(52) U.S. Cl. ...................... 423/220; 423/228; 423/229; 422/129; 422/168; 422/169; 422/170; 422/187; 422/188
(58) Field of Classification Search ................ 422/129, 422/168, 169, 170, 187, 188; 423/220, 228, 423/229; 417/68, 69
See application file for complete search history.

(56) References Cited

U.S. PATENT DOCUMENTS 4,997,630 A * 3/1991 Wagner et al. ............... 423/228
5,133,949 A * 7/1992 Elgue et al. ................. 423/220

FOREIGN PATENT DOCUMENTS

DE 220664 A * 4/1985
DE 277901 A * 4/1990
WO WO 02/18032 A2 * 3/2002

OTHER PUBLICATIONS

Arthur L. Kohl et al. "Gas Purification" 5th Ed. (1997) Gulf Publishing Co., Book Division, P. O. Box 2608, Houston, Texas 77252-2608, ISBN 0-88415-220-0, pp. 49-56.*

* cited by examiner

*Primary Examiner*—Timothy C. Vanoy
(74) *Attorney, Agent, or Firm*—Connolly Bove Lodge & Hutz LLP

(57) ABSTRACT

A process for the abatement of hydrogen sulphide in refinery gases by means of a liquid-ring compressor (10) uses, as service liquid, an aqueous solution of amines already available in the refinery itself. The process also comprises a stage of washing of the gas discharged by the compressor, by means of a column (20) mounted on a three-phase separator supplied with a regenerated solution of amines. The treatment in the liquid-ring compressor enables an effective abatement of the amount of hydrogen sulphide to be achieved, which can be further improved by washing using a regenerated amine solution supplied to the column set above the liquid/gas separator (18) downstream of the compressor.

12 Claims, 1 Drawing Sheet

PROCESS AND EQUIPMENT FOR TREATING REFINARY GASES CONTAINING HYDROGEN SULPHIDE

This application is a National Stage of PCT/EP2004/001242 filed Feb. 11, 2004 which in turn claims priority from Italian Application BG2003A000014, filed Feb. 19, 2003.

The present invention relates to a process for the treatment of refinery gases. More particularly, the invention relates to a process for the abatement of hydrogen sulphide contained in the gas produced in refineries or petrochemical plants.

In oil-refining processes and in other petrochemical processes, gaseous fractions are produced that are constituted prevalently by hydrogen, sulphur compounds, and light hydrocarbons, such as methane, ethylene, ethane, propylene, propane, butylene, butane, and other higher-boiling hydrocarbons. Said fractions may also contain ammonia, oxygen, and carbon dioxide in varying quantities. Sulphur compounds include mercaptans, carbonyl sulphide, and other compounds but are constituted mainly by hydrogen sulphide ($H_2S$). One of the possible uses of refinery gases is as fuel for the burners of the refinery itself. In certain circumstances, also depending on the presence of gasholders in the refinery, more or less large amounts of gas must be eliminated by combustion in the refinery flare. For this reason, the said gaseous fraction is referred to also as "flare gas". The amount of hydrogen sulphide in refinery gases varies according to the type of crude oil used and/or the processes carried out in the refinery or in the petrochemical plant. This amount may reach and even exceed 20 mol %. Since the combustion of hydrogen sulphide generates sulphur oxides, the dispersion of which in the atmosphere is harmful for the environment and is consequently subject to strict regulations, there exists the need to eliminate or at least reduce its amount in refinery gases to acceptable levels from the standpoint of environmental impact, both with a view to a possible reuse thereof as fuel and a view to its disposal via the flare. On the other hand, in certain cases there exists the need to compress the said refinery gases to a pressure that will enable transfer thereof from the generating units to the units for use or disposal.

In the more recent patent literature it has been proposed to use liquid-ring compressors for the compression or re-compression of refinery gases or gases emitted by mixtures of liquid hydrocarbons in the storage phase.

The patent application No. WO 02/062452 describes the use of liquid-ring compressors to compress volatile gaseous hydrocarbons (volatile organic compounds—VOCs) and obtain condensation and hence absorption thereof in a heavy liquid hydrocarbon used as service liquid for the compressor. The aim of the process described in said patent, therefore, is substantially to obtain a change of phase of the gaseous hydrocarbons, which, once condensed, are absorbed by the heavy hydrocarbon, without there occurring any change of chemical composition in the gas or in the liquid (page 4, lines 14-15). The importance that no chemical reaction occurs between the gas and the liquid is particularly emphasized (page 4, lines 1-4). The patent application No. WO 02/18032 describes a process for the treatment of gaseous hydrocarbons and/or atmospheric pollutants, comprising the step of passing the gas in a liquid-ring compressor, where the liquid constituting the liquid ring will be able to treat the gas. The liquid of the compressor is hence chosen according to the compounds to be removed or recovered from the gas; for example, a caustic liquid will be chosen to neutralize acidic gases, and an acid liquid will be chosen for neutralize caustic fumes. The process requires a pre-contact of the liquid with the gas upstream of the liquid-ring compressor in a purposely designed apparatus, consisting of a container or column containing filling material, so that an intimate contact between gas and liquid be ensured prior to input into the compressor. This appears to imply that the gas will already be at a pressure higher than atmospheric pressure (page 4, lines 25-31).

The processes described in the aforesaid documents, however, do not solve at all, or do not solve satisfactorily, the problem of abatement of hydrogen sulphide in refinery gases. Document WO 02/062452 is completely silent as regards this specific problem and in fact it teaches to prevent any chemical reaction between gases to be treated and the liquid constituting the liquid ring of the compressor. On the other hand, document WO 02/18032 describes the use of a chemical reaction between the service liquid of the compressor and the gas to be treated to enable neutralization of the latter, but makes no mention at all of the specific problem of removal of hydrogen sulphide, nor of what liquids can be used in the compressor to obtain said removal. Furthermore, the process is complicated by the need to obtain an intimate contact between liquid and gas upstream of the compressor. This in fact requires the presence of a purposely built piece of equipment, to which the liquid must be supplied in refrigerated form via a pump that draws in from a separation column downstream of the compressor.

On the other hand, the use of water as service liquid in liquid-ring compressors combined with the use of a liquid/gas separator set downstream of the compressor according to the prior art likewise leads to disadvantages. This type of process can be defined as a "semi-closed cycle" process because the water used as service liquid is recirculated from the liquid/gas separator to the compressor after passage through a cooler for reducing its temperature. However, the absence of a suitable container for collection of the hydrocarbons condensed in the liquid/gas separators according to the prior art causes loss of water saturated with hydrogen sulphide during the disposal of said hydrocarbons. This loss must be continuously replaced with make-up water. The water saturated with hydrogen sulphide must then be treated in a purposely designed treatment unit for the elimination thereof. This, combined with the fact that this type of known process requires a cooling device, involves significant operating costs. A further disadvantage of the type of process that uses water as service liquid in the liquid-ring compressor derives from the fact that the ammonia possibly present in the gas to be compressed is dissolved by the water saturated with hydrogen sulphide and, by reacting therewith, forms ammonium salts such as ammonium sulphide and/or ammonium disulphide, which accumulate in the circuit and can reach concentrations that render the service liquid corrosive.

The aim of the present invention is to eliminate or reduce the disadvantages of the known processes for the treatment of gases in oil refineries or petrochemical plants by providing a process that is simpler, more effective, and considerably less costly than the known processes. A first object of the invention is consequently to provide a process that is effective and less costly for the treatment of flare gas, said process being based upon the use of a liquid-ring compressor designed to perform the dual function of compressing the flare gases and abating the content of pollutant substances, particularly hydrogen sulphide.

Another object of the invention is to provide a process that will not require any pre-contact between the service liquid of the compressor and the gas to be treated.

A further object of the invention is to provide an apparatus for carrying out said process.

Yet a further object of the invention is to provide a process in which the efficiency of abatement of hydrogen sulphide will be further improved by the presence of a second process stage.

Yet a further object of the invention is to provide an integrated apparatus for carrying out said multistage process.

The aforesaid and other objects of the invention are achieved with a process for the treatment of refinery gases containing hydrogen sulphide, which comprises a stage of compression in a liquid-ring compressor, characterized in that said liquid-ring compressor uses, as service liquid, an aqueous solution containing an effective amount of amines that react with hydrogen sulphide.

The invention will now be described also with reference to FIG. 1, which is a schematic illustration of a preferred embodiment of the process according to the invention.

Figure 1:
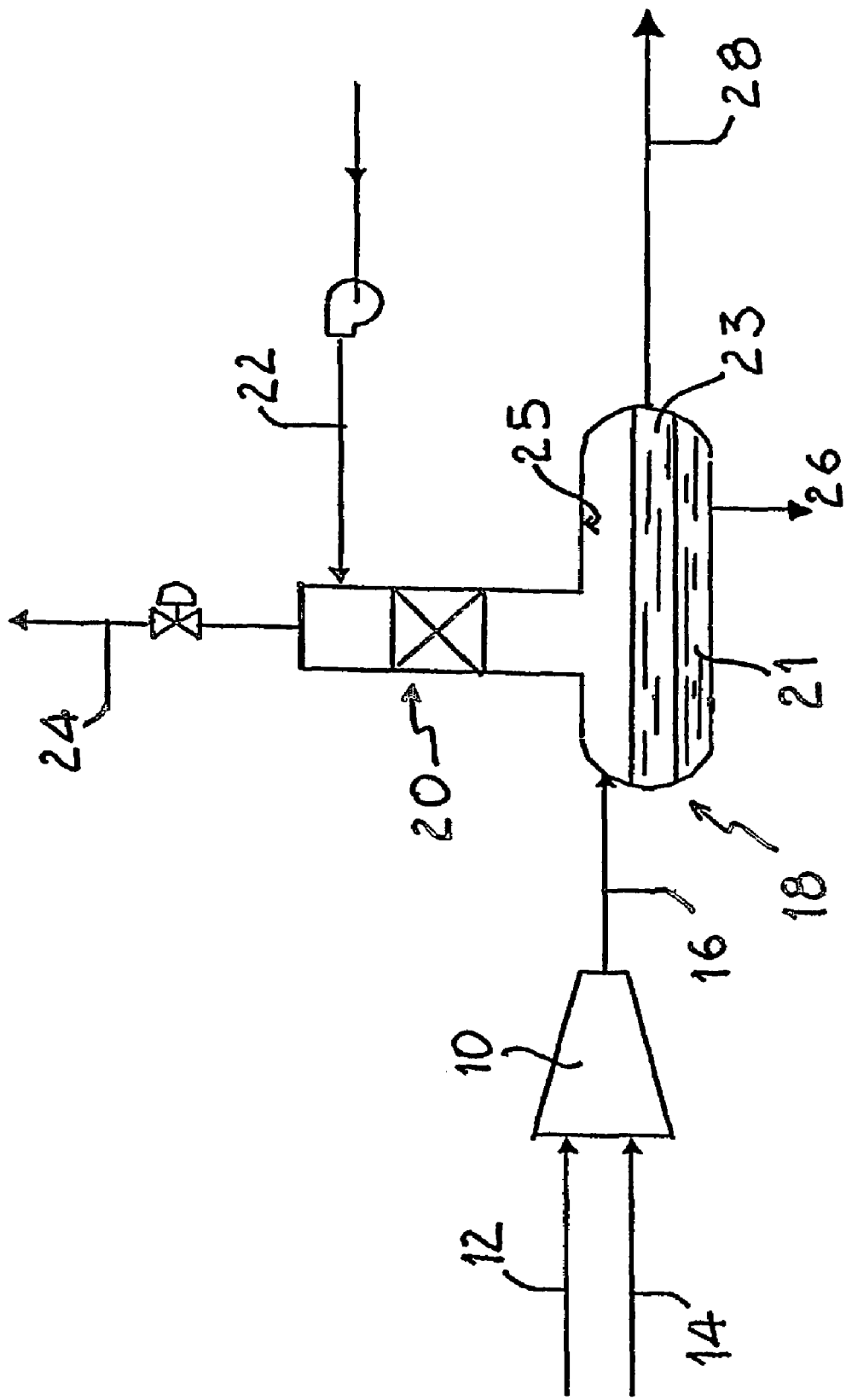
FIG. 1 is a schematic illustration of a preferred embodiment of the process disclosed herein.

As said above, a fundamental aspect of the process according to the invention lies in the use of a liquid-ring compressor for performing the dual function of compressing refinery gases and simultaneously abating the content thereof in pollutant substances, particularly hydrogen sulphide, by means of reaction between the hydrogen sulphide itself and an aqueous solution of amines. The product of reaction is solublized by the aqueous solution of amines and consequently removed from the gas phase.

The amines used for the preparation of the solution are any amine or mixture of amines that are soluble in water and are reactive with hydrogen sulphide in the conditions of temperature and pressure existing in the liquid-ring compressor. Preferred amines are the ones containing, in their molecule, functions that render them hydrophilic, and hence readily and totally soluble in water. Particularly preferred are aliphatic amines with alcoholic functions, more particularly alkanolamines, whether primary, secondary, or tertiary. Reference is made hereinafter, by way of example, to some particularly preferred alkanolamines, with corresponding molecular weights (MW) and formula:

% and 60 wt %, preferably between 15 wt % and 50 wt %. Also possible is the use of so-called "formulated" amine solutions, namely solutions containing additives, such as stabilizers, etc.

A particularly advantageous aspect of the process according to the invention is represented by the fact that aqueous solutions of amines of the aforesaid type and at the aforesaid concentrations are already normally present in refineries and/or in petrochemical plants. Said solutions are in fact used for the washing of real or liquefied gases, such as LPG, in operations that do not involve the use of a liquid-ring compressor. It is evident that the use of said solutions as service liquid for a liquid-ring compressor renders superfluous the preparation of specific amine solutions for said use, thus achieving a significant saving in terms of economy of the process.

In the conditions of operation of the liquid-ring compressor, the amine solutions referred to above are reactive also in regard to other sulphur compounds present in the flare gas, such as mercaptans or carbonyl sulphide. Said amine solutions are moreover effective also in regard to non-sulphur compounds, such as carbon dioxide. The degree of reactivity or effectiveness of abatement of said substances depends also upon the chemical nature of the amines, primary amines being more reactive than secondary and tertiary amines.

FIG. 1 is a schematic illustration of a particular embodiment of the process for the treatment of flare gas according to the invention. The gases to be treated 12 and the amine treatment solution 14 are sent directly to the intake of a liquid-ring compressor 10, without any pre-contact upstream of the compressor itself. The structure of the liquid-ring compressor is of the type known to a person skilled in the art, so that a detailed description thereof is omitted. A type of liquid-ring compressor that can be advantageously used in the process according to the invention is described, for instance, in the patent application No. European EP 0 889242 A1. Pressures typical of the gas fed into the compressor are of about 100 kPa and pressures typical at output from the compressor are around 750 kPa The content of hydrogen sulphide in the flare gas can be extremely high, for example up to approximately 16 mol %, or even higher. The amine solution performs the function of service liquid for the compressor and carries out the compression of the gas to

| Amine | Type | MW | Formula |
|---|---|---|---|
| Monoethanolanilne (MEA) | Primaay | 61 | $HO-CH_2-CH_2-NH_2$ |
| Diglycolamine (DGA) | Primary | 105 | $HO-(CH_2)_2-O-(CH_2)_2-NH_2$ |
| Diethanolamine (DEA) | Secondary | 105 | $(HO-CH_2-CH_2)_2-NH$ |
| Diisopropanolamine (DIPA) | Secondary | 105 | $HO-CH(CH_3)-CH_2-NH-CH_2-CH(CH_3)-OH$ |
| Triethanolamine (TEA) | Tertiary | 149 | $HO-(CH_2)_2-N((CH_2)_2-OH)-(CH_2)_2-OH$ |
| Methyl diethanolamine (MDEA) | Tertiary | 119 | $HO-(CH_2)_2-N(CH_3)-(CH_2)_2-OH$ |

Typically, one or more of the aforesaid amines are present in the aqueous solution in amounts comprised between 10 wt be treated. The contact between the gas and the amine solution, however, causes the hydrogen sulphide present in the gas to react with the dissolved amines, and the product of reaction to be dissolved in the solution. The result is an effective abatement of the content of hydrogen sulphide of the gas, since the amount of amine solution fed by unit of time is much higher than the amount theoretically sufficient for absorbing the amount of hydrogen sulphide contained in the gas supplied. This enables a very low content of hydrogen sulphide to be obtained in the treated gas such that, in some particular cases, a second abatement stage might not be required. In the remaining part of the description, reference will, however, be made to a second stage of the process, aimed at further reducing the content of hydrogen sulphide in the gas discharged from the liquid-ring compressor. With reference to the FIGURE, the liquid/gas mixture 16 delivered from the compressor is sent to a three-phase separator 18. The separator is formed by a cylindrical vessel, in the bottom of which there are separated two liquid phases, namely an aqueous phase 21 and a hydrocarbon phase 23. In its top portion there is a collection chamber 25 for collection of the gas phase. Mounted on the three-phase separator is a column 20, filled for example with Rashig rings, the bottom of which communicates with the chamber 25 for collection of the gas phase. The gas phase goes up the column 20 and encounters a regenerated amine solution, supplied from above by means of a line 22, designed to carry out a backwash and to achieve a further reduction of the content of hydrogen sulphide. The gas that comes out of the column from the top, along the line 24, can then be sent on for combustion. Also discharged from the separator 18 are, via the line 26, the aqueous solution of amine semi-rich in hydrogen sulphide, which can be sent on to a high-pressure absorber or to regeneration, and, via the line 28, a hydrocarbon phase.

The following example illustrates the effectiveness of the process according to the invention in a treatment of flare gas in conditions of operation that are particularly burdensome in terms of concentration of hydrogen sulphide in the gas to be treated and in terms of temperature of discharge from the compressor.

EXAMPLE

A flow of 700 Nm$^3$/h of refinery gases containing 14 mol % of hydrogen sulphide, 20 mol % of hydrogen, and 66 mol % of hydrocarbons were treated. The temperature of the gas entering the compressor was 40° C. and at output was 55° C., whilst its incoming pressure was 103 kPa and its outgoing pressure was 750 kPa. A volume of circulating liquid of 14 m$^3$/h was used, constituted by an aqueous solution containing 36 wt % of MDEA. The temperature of the solution at input was 46° C. and at output was 55° C., i.e., the same as that of the gas with which the solution was mixed. The table below gives the results of the treatment, both at output from of the compressor and at output from of the three-phase separator.

|  | Compressor | Separator |
|---|---|---|
| Feed gas (Nm$^3$/h) | 700 | 604 |
| H$_2$S in the feed gas (mol %) | 14 | 0.26 |
| Pressure of the gas at output (kPa) | 750 | 740 |
| Temperature of the gas at input (° C.) | 40 | 55 |
| Temperature of the gas at output (° C.) | 55 | 35 |
| Circulating amine solution (m$^3$/h) | 14 | 3 |
| Temperature of solution at input (° C.) | 46 | 35 |
| Temperature of solution at output (° C.) | 55 | 39 |
| H$_2$S with respect to the gas treated (mol %) | 0.26 | <0.002 |

Consequently, with the process according to the present invention a reduction of the hydrogen sulphide by a factor greater than 50 is obtained at output from the compressor, and a final reduction by a factor of 7000 is obtained at output from the separator. The residual content of hydrogen sulphide at output from the compressor may thus already be sufficient, in certain cases, to enable sending the treated gas on directly for combustion.

As regards the disadvantages described previously with reference to the use of water as service liquid in liquid-ring compressors used in the known so-called "semi-closed cycle" processes, the use of aqueous solutions of amines, together with the use of liquid/gas separators according to the invention, enables elimination of the disadvantages described to earlier in so far as the process according to the invention is of the "open" type; i.e., the service liquid is not recirculated to the compressor, but can be sent on to one or more conventional absorbers that work at medium pressure, or directly to the regeneration unit. Thus both the accumulation of ammonium sulphides and/or ammonium disulphides in the circuit and the need for cooling of the service liquid are prevented.

The foregoing description regards a preferential embodiment of the invention, but it is evident that the invention may undergo numerous modifications and variations, all falling within the scope of the inventive idea, as defined in the appended claims.

The invention claimed is:

1. A process for the treatment of refinery gases containing hydrogen sulphide, comprising:
    a) a stage of compression of said gas in a liquid-ring compressor that uses, as service liquid, an aqueous solution containing an effective amount of amines that are reactive with said hydrogen sulphide; and
    b) a stage of washing said gas discharged by said liquid-ring compressor, said washing being obtained by means of an aqueous solution containing an effective amount of amines that are reactive with the residue of hydrogen sulphide present in said gas discharged by said compressor;
    wherein said washing stage is carried out in a column mounted on a three-phase separator, in which there is introduced a gas-liquid mixture coming from said liquid-ring compressor.

2. Process according to claim 1, characterized in that said amines contain one or more alcoholic functions.

3. Process according to claim 2, characterized in that said amines are alkanolamines.

4. Process according to claim 3, characterized in that said alkanolamines are selected from the group consisting of monoethanolamine, diglycolamine, diethanolamine, diisopropanolamine, triethanolamine and methyl diethanolamine.

5. Process according to claim 1, characterized in that said effective amount of amines is comprised between 10 wt % and 60 wt %.

6. Process according to claim 5, characterized in that said effective amount of said amines is comprised between 15 wt % and 50 wt %.

7. Process according to claim 1, characterized in that it re-uses an aqueous solution of amines already available in the refinery or petrochemical plant, said aqueous solution of amines having been prepared for the washing of real gases or liquefied gases.

8. Process according to claim 1, characterized in that said refinery gases and said service liquid are supplied by means of two separate lines to liquid-ring compressor.

9. Process according to claim 8, characterized in that said refinery gases and said service liquid are in contact with one another only in said liquid-ring compressor.

10. Process according to claim 1, characterized in that said aqueous solution of amines is supplied from the top of said column, in countercurrent with respect to said gas to be washed.

11. Apparatus for the treatment of refinery gases, characterized in that it comprises:
   a. a liquid-ring compressor, which uses, as service liquid, an aqueous solution of amines, provided with two separate supply lines for said refinery gases and for said aqueous solution of amines;
   b. a three-phase separator set downstream of said compressor, said separator comprising a gas-collection chamber, a line for discharge of an aqueous phase, and a line for discharge of a hydrocarbon phase; and
   c. a column for washing gases in communication with said gas-collection chamber of said three-phase separator, said column being provided, at the top, with a line for supply of a washing liquid and with a line for discharge of the washed gas.

12. Apparatus according to claim 11, characterized in that said washing column is installed directly on said three-phase separator.

* * * * *